(12) United States Patent
Vishwanathan

(10) Patent No.: US 8,601,257 B2
(45) Date of Patent: Dec. 3, 2013

(54) METHOD, CLUSTER SYSTEM AND COMPUTER-READABLE MEDIUM FOR DISTRIBUTING DATA PACKETS

(75) Inventor: Rajendran Vishwanathan, San Jose, CA (US)

(73) Assignee: Fujitsu Siemens Computers Inc., Sunnyvale, CA (US)

( * ) Notice: Subject to any disclaimer, the term of this patent is extended or adjusted under 35 U.S.C. 154(b) by 1344 days.

(21) Appl. No.: 11/484,848

(22) Filed: Jul. 12, 2006

(65) Prior Publication Data

US 2007/0022284 A1    Jan. 25, 2007

Related U.S. Application Data

(60) Provisional application No. 60/698,463, filed on Jul. 12, 2005.

(51) Int. Cl.
    *H04L 29/06*      (2006.01)
(52) U.S. Cl.
    USPC .......................................................... 713/153
(58) Field of Classification Search
    USPC .......................................................... 713/153
    See application file for complete search history.

(56) References Cited

U.S. PATENT DOCUMENTS

| | | | | |
|---|---|---|---|---|
| 5,444,782 | A * | 8/1995 | Adams et al. | 713/153 |
| 6,170,057 | B1 * | 1/2001 | Inoue et al. | 713/153 |
| 6,185,680 | B1 * | 2/2001 | Shimbo et al. | 713/160 |
| 6,240,514 | B1 * | 5/2001 | Inoue et al. | 713/153 |
| 6,330,236 | B1 * | 12/2001 | Ofek et al. | 370/369 |
| 6,691,165 | B1 * | 2/2004 | Bruck et al. | 709/227 |
| 6,941,366 | B2 * | 9/2005 | Antes et al. | 709/224 |
| 6,961,539 | B2 * | 11/2005 | Schweinhart et al. | 455/12.1 |
| 7,043,553 | B2 * | 5/2006 | Monsen et al. | 709/229 |
| 7,111,163 | B1 * | 9/2006 | Haney | 713/153 |
| 7,200,684 | B1 * | 4/2007 | Schales et al. | 709/252 |
| 7,448,081 | B2 * | 11/2008 | Balissat et al. | 726/15 |
| 7,454,489 | B2 * | 11/2008 | Chauffour et al. | 709/223 |
| 7,535,907 | B2 * | 5/2009 | Hussain et al. | 370/392 |

FOREIGN PATENT DOCUMENTS

| | | |
|---|---|---|
| WO | 9933227 A1 | 7/1999 |
| WO | 2004049656 A1 | 6/2004 |

OTHER PUBLICATIONS

S. Kent, R. Atkinson; RFC 2406: IP Encapsulating Security Payload (ESP); Nov. 1998.*
Gross, G. "The Group Security Association Key Management Protocol Application to the IP Security Architecture", ITEF Standard Working Draft, Internet Engineering Task Force, CH Jul. 4, 2004, XP015013793, pp. 30,43.

* cited by examiner

*Primary Examiner* — Edan Orgad
*Assistant Examiner* — James Turchen
(74) *Attorney, Agent, or Firm* — Edell, Shapiro & Finnan, LLC

(57) ABSTRACT

A method, a cluster system, and a computer-readable medium for distributing data packets addressed to at least one virtual address over a communication network using a protocol, which allows for at least some content of the data packet to be encrypted, to a multiplicity of service nodes. The method includes receiving incoming data packets addressed to a virtual address through a packet analyzer and identifying whether the incoming data packets are encrypted. Each encryption data packet is forwarded to a decryption module and a decrypted data packet is returned. Based on the decrypted data packet, a scheduling decision is made by a scheduling module. Scheduling data is then combined with the originally received encrypted data packet such that the encrypted data packet can be forwarded to one service node for further processing.

12 Claims, 2 Drawing Sheets

METHOD, CLUSTER SYSTEM AND COMPUTER-READABLE MEDIUM FOR DISTRIBUTING DATA PACKETS

CROSS REFERENCE TO RELATED APPLICATION

This application claims priority under 35 U.S.C. §119(e) to U.S. Provisional Application No. 60/698,463, filed Jul. 12, 2005, entitled "Method, Cluster System and Computer-Readable Medium for Distributing Data Packets," the entire contents of which are hereby incorporated by reference.

FIELD OF THE INVENTION

The invention relates to a method, a cluster system, and a computer-readable medium for distributing data packets addressed to at least one virtual address received over a communication network using a protocol, which allows for at least some content of the data packets to be encrypted, to a multiplicity of service nodes.

BACKGROUND

Methods and apparatuses for distributing data packets to a multiplicity of service nodes are commonly used in so-called cluster systems providing services to a large number of clients. A particular well-known example is so-called server farms providing web services to the Internet.

Originally the transmission control protocol and the Internet protocol (TCP/IP) did not provide any method for packet authentication or encryption. The most popular application level protocol, the hypertext transport protocol (HTTP) also does not provide any security mechanisms.

With the growing importance of web services such as e-commerce and e-business, a great need for secure Internet communication has arisen. To overcome the lack of security, various protocols for including security mechanisms like authentication and encryption were designed for the different layers of the TCP/IP protocol stack.

The secure socket layer (SSL) protocol is an extra layer, added between the transport layer, managing connections between two computers, and the application layer and provides transparent authentication and encryption to higher level protocols. In practice, however, it is only commonly used in combination with the HTTP protocol, which is then referred to as secure HTTP or HTTP over SSL (HTTPS).

Because of the relatively high overhead in terms of processing performance it is only used for a few types of applications such as online banking and electronic payment systems. In order to spread the use of secure communication on the Internet to other applications and application protocols, the IP security (IPsec) standard integrates authentication and encryption directly into the network layer. To this end, an additional packet header is introduced which is placed immediately after the IP header comprising the source and destination address of the packet. The additional header is placed before the TCP or UDP header of the transport layer, which comprises, among other data, the source and destination port number of the packet. The additional IPsec header can comprise either an authentication header (AH) or an encapsulated secure payload (ESP) header or both. In the case where encryption is used, the data following the ESP header is encrypted, including the data contained in a subsequent UDP or TCP header.

Encryption can be used in two different modes called tunnel mode and transport mode, respectively. In tunnel mode, the entire data packet to be transmitted over a network is encrypted and included in a new data packet as payload. In transport mode, only the content of the original data packet is encrypted, but some of its header information, particularly the IP header comprising source and destination address and the ESP header comprising encryption information remain unencrypted.

If such a partially encrypted data packet is received by a single server, the decryption of the packet's content takes place before the packet is passed to the transport layer and processing can proceed in the same way as without encryption.

If the IP packet is received by a cluster system, however, data packets are usually distributed to different service nodes of the cluster for further processing. In order to decide which packet is to be processed by what service node, a packet analyzer usually scans the headers of the received packets for service information, such as the port number or application protocol. This information, however, is not available at the network layer in case of an encrypted IPsec packet. Consequently, IPsec is currently not used in cluster systems identified by a common virtual address, but always directed to a physical address of a single server. This has the disadvantage that the scalability and reliability of cluster systems currently cannot be used in combination with the security offered by the IPsec standard.

SUMMARY

According to the invention, at least partially encrypted data packets are distributed to a plurality of service nodes with minimal changes to existing cluster systems, particularly without modification to existing packet schedulers. Data packets addressed to at least one virtual address received over a communication network using a protocol, which allows for at least some content of the data packets to be encrypted, are distributed to a multiplicity of service nodes. A cluster system is provided that includes a multiplicity of service nodes, at least one gateway node, a packet analyzer that analyzes destination addresses and encryption states of incoming data packets, a packet decryption module comprising a predefined key that decrypts encrypted content of data packets, and a packet scheduler that determines which of the service nodes to be used for data packets addressed to at least one virtual address based on data packets' content. An incoming data packet addressed to a virtual address through the gateway is received and the encryption state of the received data packet is identified via the packet analyzer. If no encryption is identified, the received data packet is scheduled via the packet scheduler. If encryption is identified, the encryption data packet is decrypted via the packet encryption module and the decrypted data packet is scheduled via the packet scheduler. The received data packet is then distributed to one of the service nodes according to the scheduling.

The inventive method has the advantage that an existing packet scheduler can be used to make scheduling decisions even if received data packets are partially encrypted. According to the present invention partially encrypted data packets are picked up by a packet analyzer and decrypted before a decrypted version of the packet is sent on to the packet scheduler. After the packet scheduler has made a scheduling decision based on the decrypted content of the data packet, the data packet can be replaced by the encrypted version again, such that the service node or any higher level protocol tools are not aware of the intermediate decryption. Thus, the inventive method can be introduced transparently to an existing cluster system.

In a first embodiment of the present invention, incoming encrypted data packets are temporarily stored by the packet analyzer and a decrypted copy of the packet is sent to the packet scheduler for scheduling. The decision of the packet scheduler is returned to the packet analyzer, which then sends the originally received packet onto the service node according to the decision of the packet scheduler.

In another implementation of the method, an additional packet exchange module is provided, which picks up previously encrypted packets, which were decrypted for the packet scheduler and replaces them with the originally encrypted data packets, which are forwarded from the packet analyzer to the packet exchange module. This embodiment has the advantage that it can be implemented in a typical queue oriented software system.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

The invention will be described in the following using exemplary embodiments shown in the following figures.

DETAILED DESCRIPTION

Figure 1:
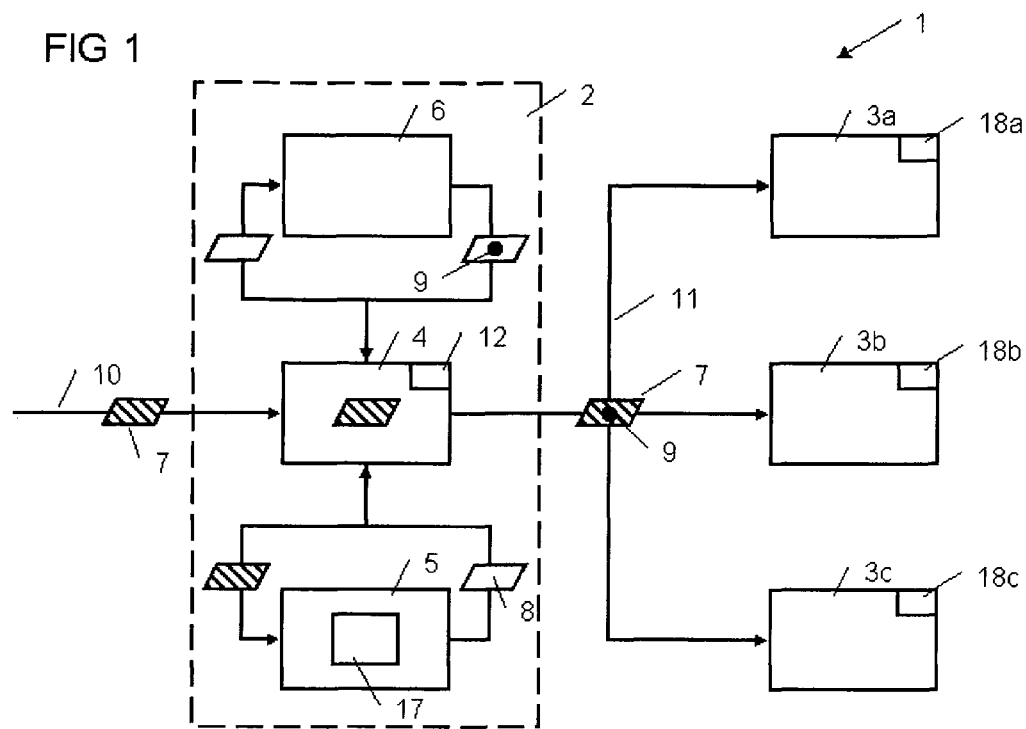
FIG. 1 shows a first exemplary embodiment of the present invention.

FIG. 1 shows a cluster system 1 comprising a gateway node 2 and three service nodes 3A, 3B, and 3C. Each of the service nodes 3A, 3B and 3C has a unique address 18A, 18B, and 18C respectively. The gateway node 2 and the service nodes 3 are connected through an internal network 11. The gateway node 2 comprises a packet analyzer 4, a packet decryption module 5 and a packet scheduler 6. The packet decryption module 5 contains a decryption key 17, and the packet analyzer 4 comprises at least one predetermined virtual address 12. In addition, the gateway node 2 is connected to a communication network 10.

The packet analyzer 4 receives data packets from the communication network 10. Packet analyzer 4 checks whether incoming packets are address to the predetermined virtual address 12 and whether the incoming packets are encrypted. If an encrypted packet 7 is found, a copy of the encrypted packet 7 is stored and the packet 7 is forwarded to the packet decryption module 5.

The packet decryption module 5 decrypts the encrypted data packet 7 using the decryption key 17 and returns a decrypted packet 8 to the packet analyzer 4.

The decrypted packet 8 is then forwarded to the packet scheduler 6, which makes a scheduling decision based on the decrypted packet's content. Scheduling data 9 is then returned from the packet scheduler 6 to the packet analyzer 4, either alone or contained in the decrypted packet 8. For example, the packet scheduler 6 can return its scheduling decision by overwriting the virtual address 12 originally contained in the data packet 8 with one of the unique addresses 18A, 18B or 18C of the service nodes 3A, 3B or 3C. Alternatively the packet scheduler 6 can add an additional header to the returned data packet 8.

The packet analyzer 4 combines the stored encrypted packet 7 with the received scheduling data 9 and forwards the resulting data packet to the internal network 11. For example, a destination address 18A, 18B or 18C contained in a modified or additional header of the returned data packet 8 can be included in the stored encrypted packet 7. The data packet 7 is then forwarded to one of the service nodes 3A, 3B, 3C for further processing.

If an open, i.e., unencrypted data packet, is received by the packet analyzer 4 from the data network 10, the packet is forwarded directly to the packet scheduler 6, without prior decryption or intermediate storage.

The embodiment shown in FIG. 1 has the additional advantage that all processing of the unencrypted data packet 8 takes place within the gateway node 2. Thus, even in cases were the internal communication network 11 is deemed to be insecure, e.g., because it is an open network connecting service nodes 3 at locations different from the location of the gateway node 2, the data exchanged over the networks 10 and 11 remains secure.

Figure 2:
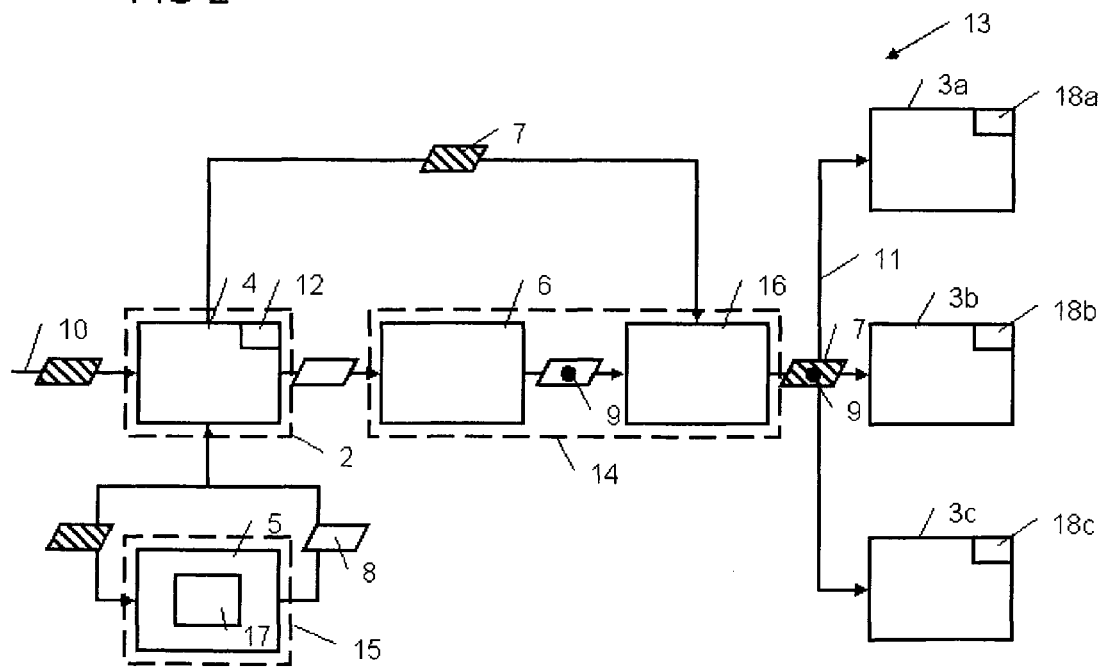
FIG. 2 shows a second exemplary embodiment of the present invention.

FIG. 2 shows another exemplary embodiment of the present invention. A cluster system 13 comprises a gateway node 2, a routing node 14, a decryption node 15 and three service nodes 3A, 3B, and 3C with addresses 18A, 18B, and 18C, respectively. All nodes are connected by an internal network 11. The gateway node 2 is further connected to a communication network 10.

The gateway node 2 comprises a packet analyzer 4. The packet analyzer 4 analyzes incoming data packets and compares them with at least one predetermined virtual address 12. If an encrypted packet 7 is detected by the packet analyzer 4, the encrypted data packet 7 is forwarded to a decryption module 5 of the decryption node 15 and to a packet exchange module 16 of the routing node 14.

The decryption module 5 decrypts the incoming encrypted packet 7 using a decryption key 17 and returns a decrypted packet 8 to the gateway node 2. The gateway node 2 then forwards the decrypted data packet 8 to a packet scheduler 6 of the routing node 14. Alternatively, the decryption node 15 can also forward the decrypted packet 8 to the routing node 14 directly.

The packet scheduler 6 inside the routing node 14 makes a scheduling decision based on the decrypted data packet 8 and adds scheduling data 9, typically the address 18A, 18B, or 18C of one of the service nodes 3A, 3B, or 3C to the data packet 8. Because the packet scheduler 6 receives only decrypted packets 8, i.e., data packets without any IPsec information, all scheduling algorithms and systems developed for the original IP protocol can be utilized without change.

The modified data packet 8 is then detected and picked up by the packet exchange module 16, which also runs within the routing node 14. For example, the packet exchange module 16 could analyze source address of data packets 7 scheduled by the packet scheduler and compare them with source addresses of the forwarded encrypted data packet 7. The authentication header used by IPsec also contains a packet sequence number, which can be used for identification of data packets to be exchanged. The packet exchange module 16 then exchanges the decrypted data packet 8 with the encrypted data packet 7, which was previously sent to it. At the same time, exchange module 16 maintains the scheduling data 9, e.g., its new destination address 18A, 18B, or 18C. The encrypted data packet 7 comprising the scheduling data 9 is then forwarded to one of the service nodes 3A, 3B, or 3C for further processing.

As in the previous embodiment, the inventive method can also be used in a network, in which unencrypted data packets are received by the gateway node 2. If an unencrypted data packet 8 is received by the packet analyzer 4, it is simply forwarded to the scheduling module 6 and ignored by the packet exchange module 16. Thus, the performance of existing systems for distributing data packets in a cluster system can be maintained for unencrypted data traffic, while allowing supporting encrypted data traffic.

As shown by the two different embodiments shown in FIGS. 1 and 2, the different functional modules 3, 4, 5, 6 and 16 of the cluster system 1 and 13 can be either implemented in hardware or software. Forwarding data packets from one module to another can be achieved either by means of software interfaces or by physically sending them from one node of the cluster system 1 or 13 to another. In practice, many of the nodes of the cluster system 1 and 13 will be replicated for reasons of performance and reliability. In case several redundant gateway nodes 2 and/or decryption nodes 5 exist, all packet decryption modules 5 must contain the same decryption key 17.

As previously mentioned, the IPsec standard also allows for authentication of data packets. If authentication is desired, either alone or in addition to the encryption of data packets, such functionality can be implemented using the same architecture as described above and shown in FIG. 1 and 2, respectively.

In this case an additional authentication module, either as part of the gateway node 2 or as a separate node of the cluster system 1 or 13 respectively must be provided. If the packet analyzer 4 identifies an incoming data packet containing an authorization header, the packet is forwarded to the authentication module prior to making a scheduling decision. If the packet is deemed to be authentic, it is forwarded to the scheduling module 6. Otherwise, the packet may be rejected or forwarded to a special node or module for further analysis, e.g., to analyze whether a safety-critical attack on the cluster system 1 or 13 is being carried out over the data network 10.

If both AH and ESP headers are present, they are analyzed and processed in the order they are included in the received data packet 7, i.e., a data packet containing a AH header followed by an ESP header is authenticated first and decrypted afterwards and vice versa.

Figure 3:
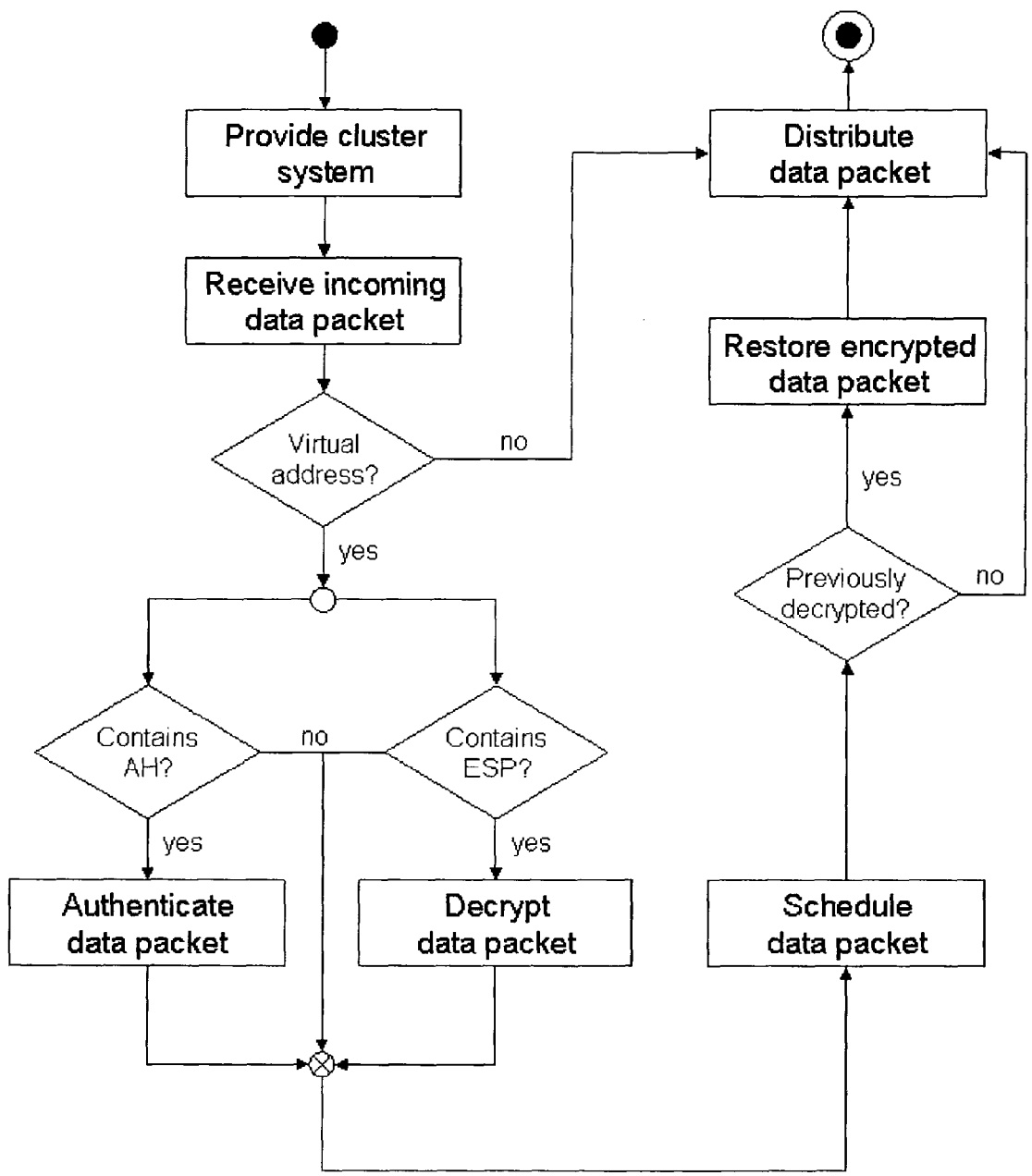
FIG. 3 shows a flow chart of an exemplary embodiment of the inventive method.

A flow chart summarizing the above-described methodology, including both authentication and decryption of data packets, is shown in FIG. 3.

Typically, outgoing data packets returned from the service nodes 3 to a client node over the network 10 also will be encrypted. In order to make good scheduling decisions, the packet scheduler 6 needs to maintain information about open connections between any client system and service node 3, such that all requests belonging to one connection are send to the same service node 3. Thus, it is important to scan outgoing data packets for connection closure. However, outgoing data packets may be encrypted, such that data required to determine the state of an connection is not available to the packet scheduler 6.

For this reason, in a further embodiment of the invention, data packets are scanned for connection closure before they are encrypted. This can be done, for example, by a separate encryption module used to add the IPsec headers to outgoing data packets. The gathered information can then be forwarded to the packet scheduler 6, either through a separate interface or as part of the outgoing data packets, e.g., in form of an additional packet header. Such additional information must be stripped from the outgoing data packets before they are finally returned over the communication network 10, for example by the packet analyzer 4.

Alternatively, outgoing data packets can be sent through the same processing queue as incoming packets, i.e., they can be analyzed, decrypted if necessary, forwarded to the scheduler and subsequently replaced with the originally encrypted outgoing data packet as described above.

Having described preferred embodiments of the invention, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

The invention claimed is:

1. A method for distributing to a plurality of service nodes a data packet addressed to at least one virtual address provided in an IP header of the data packet as the destination address and received over a communication network using a protocol that allows at least some content of the data packets including the data contained in a subsequent UDP or TCP header to be encrypted, the method comprising:

a) receiving an incoming data packet addressed to a virtual address through a gateway node of a cluster system identified by at least one common virtual address comprising: a plurality of service nodes; at least one gateway node; a packet analyzer that analyzes destination addresses and encryption states of incoming data packets; a packet decryption module comprising a key that decrypts encrypted content of data packets; and a packet scheduler that determines which of the service nodes receives data packets addressed to the at least one virtual address based upon service information comprising at least one of a port number and an application protocol contained in the UDP or TCP header of the data packets;

b) identifying the encryption state of the incoming data packet via the packet analyzer based upon the presence of an ESP header in the incoming data packets;

c) scheduling the received data packet via the packet scheduler based upon the port number or the application protocol in the service information contained in the UDP or TCP header of the received data packet in response to no encryption being identified in b);

d) in response to encryption being identified in b):
   storing the incoming data packet that is identified as being encrypted via the packet analyzer to form a stored data packet;
   decrypting the incoming data packet including the UDP or TCP header via the packet decryption module to form a decrypted data packet;
   forwarding the decrypted data packet to the packet scheduler;
   determining the scheduling data via the packet scheduler based on the decrypted data packet and based upon the port number or the application protocol in the service information contained in the UDP or TCP header of the decrypted data packet; and
   modifying the stored data packet according to the scheduling data via the packet analyzer to form a modified data packet; and e) distributing the modified data packet in its encrypted state to one of the service nodes having a unique address according to the determination of the packet scheduler.

2. The method of claim 1, wherein:
a) further comprises verifying authentication data of data packets via a packet authentication module;
b) further comprises detecting data packets containing authentication data; and
c) and d) further comprise forwarding data packets containing authentication data to the authentication module for authentication.

3. The method of claim 1, wherein:
d) further comprises overwriting, by the packet analyzer, the virtual address in the IP header of the stored data packet with the unique address of one of the service nodes.

4. The method of claim 1, wherein the method is performed the gateway node by executing instructions stored on a computer-readable storage device.

5. A method for distributing to a plurality of service nodes a data packet addressed to at least one virtual address provided in an IP header of the data packet as the destination address and received over a communication network using a protocol that allows at least some content of the data packets including the data contained in a subsequent UDP or TCP header to be encrypted, the method comprising:
a) receiving an incoming data packet addressed to a virtual address through a gateway node of a cluster system identified by at least one common virtual address comprising a plurality of service nodes, at least one gateway node, a packet analyzer that analyzes destination addresses and encryption states of incoming data packets, a packet decryption module comprising a key that decrypts encrypted content of data packets, a packet scheduler that determines which of the service nodes receives data packets addressed to the at least one virtual address based upon service information comprising at least one of a port number and an application protocol contained in the UDP or TCP header of the data packets, and a packet exchange module;
b) identifying the encryption state of the incoming data packet via the packet analyzer based upon the presence of an ESP header in the incoming data packets;
c) scheduling the received data packet via the packet scheduler based upon the port number or the application protocol in the service information contained in the UDP or TCP header of the received data packet in response to no encryption being identified in b);
d) in response to encryption being identified in b):
copying the data packet identified as being encrypted to form a copied data packet;
decrypting the copied data packet including the UDP or TCP header via the packet decryption module to form a decrypted data packet;
forwarding the decrypted data packet from the packet decryption module to the packet scheduler for scheduling;
scheduling the decrypted data packet via the packet scheduler based upon the port number or the application protocol in the service information contained in the UDP or TCP header of the decrypted data packet to form a scheduled data packet;
forwarding the encrypted incoming data packet from the packet analyzer to the packet exchange module; and
intercepting the scheduled data packet and replacing the scheduled data packet with the forwarded incoming data packet via the packet exchange module; and
e) distributing the forwarded incoming data packet in its encrypted state to one of the service nodes having a unique address according to the determination of the packet scheduler.

6. The method of claim 5, wherein:
a) further comprises verifying authentication data of data packets via a packet authentication module;
b) further comprises detecting data packets containing authentication data; and
c) and d) further comprise forwarding data packets containing authentication data to the authentication module for authentication.

7. The method of claim 5, wherein:
d) further comprises overwriting, by the packet exchange module, the virtual address in the IP header of the forwarded incoming data packet with the unique address of one of the service nodes.

8. The method of claim 5, wherein the method is performed the gateway node by executing instructions stored on a computer-readable storage device.

9. In a cluster system including at least one virtual address, comprising a gateway node and a plurality of service nodes, each service node having a unique address, the gateway node and the service nodes being connected by a communication network, the cluster system further comprising a packet analyzer, a packet decryption module and a packet scheduler, a method for scheduling a partially encrypted data packet comprising an unencrypted IP header comprising the virtual address as a target address, an unencrypted ESP header comprising encryption information and an encrypted UDP or TCP header comprising service information, the service information comprising at least one of a port number and an application protocol, the method comprising:
receiving, by the gateway node, the partially encrypted data packet;
identifying, by the packet analyzer, that the received data packet is partially encrypted based upon the presence of the ESP header;
decrypting, by the packet decryption module, the encrypted content of the data packet including the encrypted UDP or TCP header to form a decrypted data packet;
determining scheduling data, by the packet scheduler, based upon the port number or the application protocol in the service information contained in the decrypted content of the decrypted data packet;
combining the encrypted content of the originally received data packet with the determined scheduling data of the packet scheduler to form a combined data packet comprising the encrypted content and the determined scheduling data; and
forwarding the combined data packet to the communication network for distributing the combined data packet to one of the service nodes identified by a unique address based upon the scheduling data.

10. The method of claim 9, further comprising:
detecting, by the packet analyzer, data packets containing authentication data;
verifying authentication data of data packets via a packet authentication module; and
forwarding data packets containing authentication data to the authentication module for authentication.

11. The method of claim 9, further comprises overwriting, by the packet exchange module, the virtual address in the IP header of the received data packet with the unique address of one of the service nodes.

12. The method of claim 9, wherein the method is performed the gateway node by executing instructions stored on a computer-readable storage device.

* * * * *